(12) United States Patent
Horne

(10) Patent No.: US 10,486,429 B2
(45) Date of Patent: Nov. 26, 2019

(54) PRINT HEAD INK SUPPLY

(71) Applicant: Assa Abloy AB, Stockholm (SE)

(72) Inventor: David Horne, Hitchin (GB)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 15/872,110

(22) Filed: Jan. 16, 2018

(65) Prior Publication Data

US 2018/0304640 A1     Oct. 25, 2018

Related U.S. Application Data

(60) Provisional application No. 62/488,170, filed on Apr. 21, 2017.

(51) Int. Cl.
| | |
|---|---|
| *B41J 2/175* | (2006.01) |
| *G01F 23/26* | (2006.01) |
| *B41M 3/00* | (2006.01) |
| *B41J 2/18* | (2006.01) |

(52) U.S. Cl.
CPC ....... *B41J 2/17566* (2013.01); *B41J 2/17513* (2013.01); *B41J 2/18* (2013.01); *B41M 3/00* (2013.01); *G01F 23/26* (2013.01); *B41J 2002/17579* (2013.01)

(58) Field of Classification Search
CPC .... B41J 2/17566; B41J 2/17513; B41M 3/00; G01F 23/26
See application file for complete search history.

(56) References Cited

U.S. PATENT DOCUMENTS

| 5,682,184 A | 10/1997 | Stephany et al. |
| 8,550,609 B2 * | 10/2013 | Knierim ............... B41J 2/17593 |
| | | 347/7 |
| 9,132,656 B2 * | 9/2015 | Nicholson, III ..... B41J 2/17566 |

OTHER PUBLICATIONS

Technical document titled "FDC1004 4-Channel Capacitance-to-Digital Converter for Capacitive Sensing Solutions" Texas Instruments Incorporated, SNOSCY5B, Aug. 2014, revised Apr. 2015, 33 pages.

* cited by examiner

*Primary Examiner* — Thinh H Nguyen
(74) *Attorney, Agent, or Firm* — Schwegman Lundberg & Woessner, P.A.

(57) ABSTRACT

A print head ink supply includes first and second containers and a level sensor positioned between the first and second containers. The first and second containers are each configured to contain a volume of ink within an interior chamber. The level sensor includes a first capacitive sensor configured to output a first level signal indicative of a level of ink within the interior chamber of the first container, and a second capacitive sensor configured to output a second level signal indicative of a level of ink within the interior chamber of the second container.

20 Claims, 7 Drawing Sheets

PRINT HEAD INK SUPPLY

CROSS-REFERENCE TO RELATED APPLICATION

The present application is based on and claims the benefit of U.S. provisional patent application Ser. No. 62/488,170, filed Apr. 21, 2017, the content of which is hereby incorporated by reference in its entirety.

BACKGROUND

Ink jet printers eject ink onto a print medium through one or more print heads in a controlled pattern of closely spaced dots. Black or color images may be formed. The print heads are each supplied with a different color ink to form black and color images. For example, an ink jet printer may include reservoirs of cyan, magenta, yellow, and black inks.

The reservoirs of ink may be attached to the print heads. These reservoirs may take the form of header tanks that receive ink from corresponding bulk containers, or stand-alone cartridges.

It is desirable to detect the level of ink in the reservoirs to ensure a proper supply of ink to the print heads. For instance, when the ink reservoirs are in the form of header tanks, it is desirable to trigger refilling of the header tanks from their corresponding bulk supplies when the level of ink in the header tank reaches a predetermined threshold level to ensure a continuous supply of ink to the print heads. When the ink reservoirs are in the form of cartridges, it is desirable to detect the level of ink within the cartridges to allow the user to be notified when the level of ink within the cartridges has reached a predetermined threshold level, so that the cartridges can be replaced before the ink supply is exhausted.

SUMMARY

Embodiments of the present disclosure are generally directed to a print head ink supply for use with a print head having one or more nozzles, and a credential production device that includes the print head ink supply. One embodiment of the print head ink supply includes first and second containers and a level sensor positioned between the first and second containers. The first and second containers are each configured to contain a volume of ink within an interior chamber. The level sensor includes a first capacitive sensor configured to output a first level signal indicative of a level of ink within the interior chamber of the first container, and a second capacitive sensor configured to output a second level signal indicative of a level of ink within the interior chamber of the second container.

One embodiment of the credential production device includes a transport mechanism, a print head having a plurality of nozzles, the above-described ink supply configured to supply the plurality of nozzles with ink, and a controller. The transport mechanism is configured to feed individual substrates along a processing path. The controller is configured to perform a print operation using the transport mechanism and the print head, and detect low level ink conditions within the first and second containers of the ink supply using the first and second level signals from the level sensor of the ink supply.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
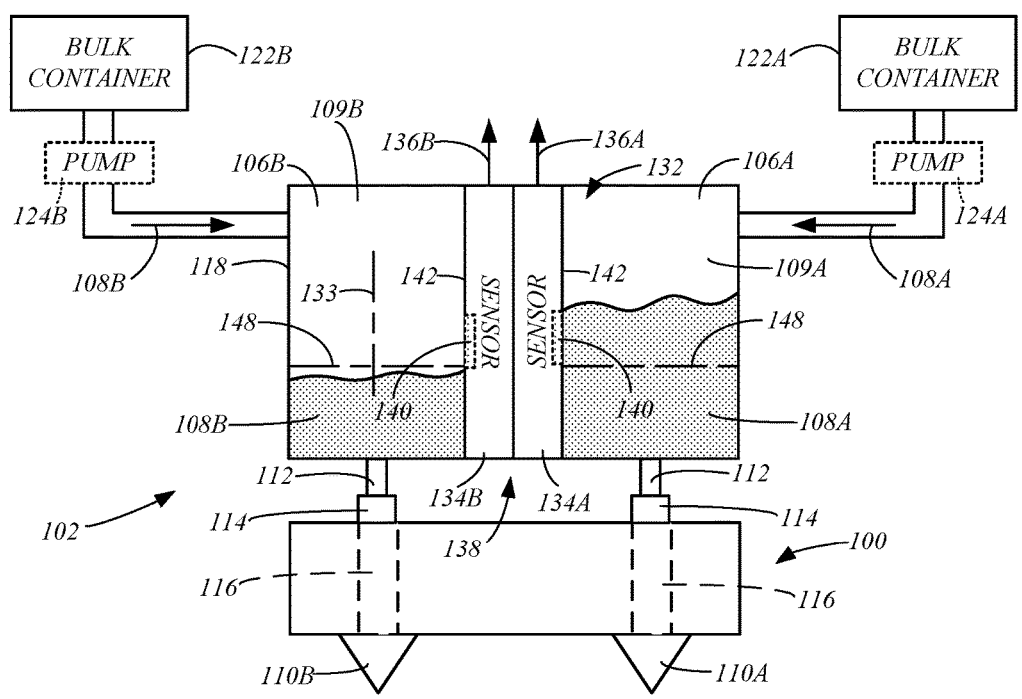
FIG. 1 is a simplified illustration of an exemplary print head and an attached ink supply in accordance with embodiments of the present disclosure.
Figure 2:
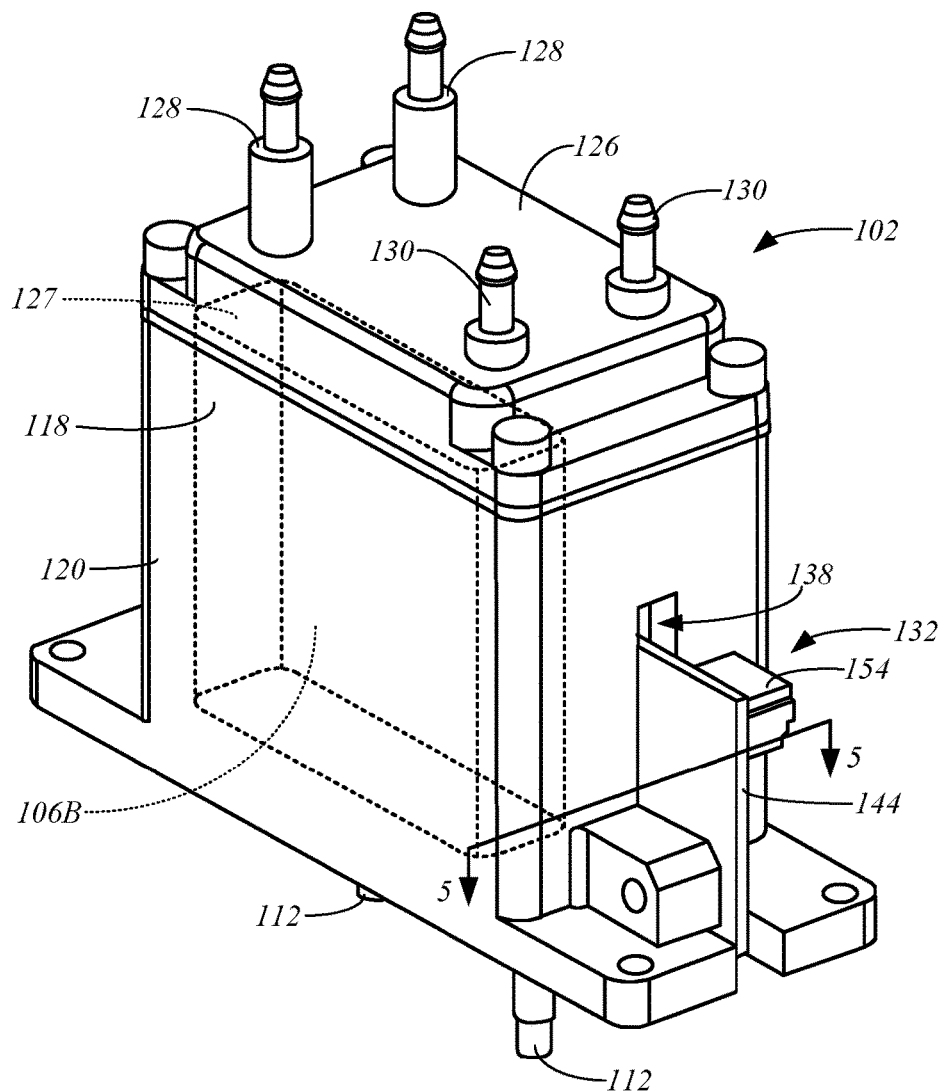
FIGS. 2 and 3 are isometric views of an exemplary ink supply in accordance with embodiments of the present disclosure.
Figure 3:
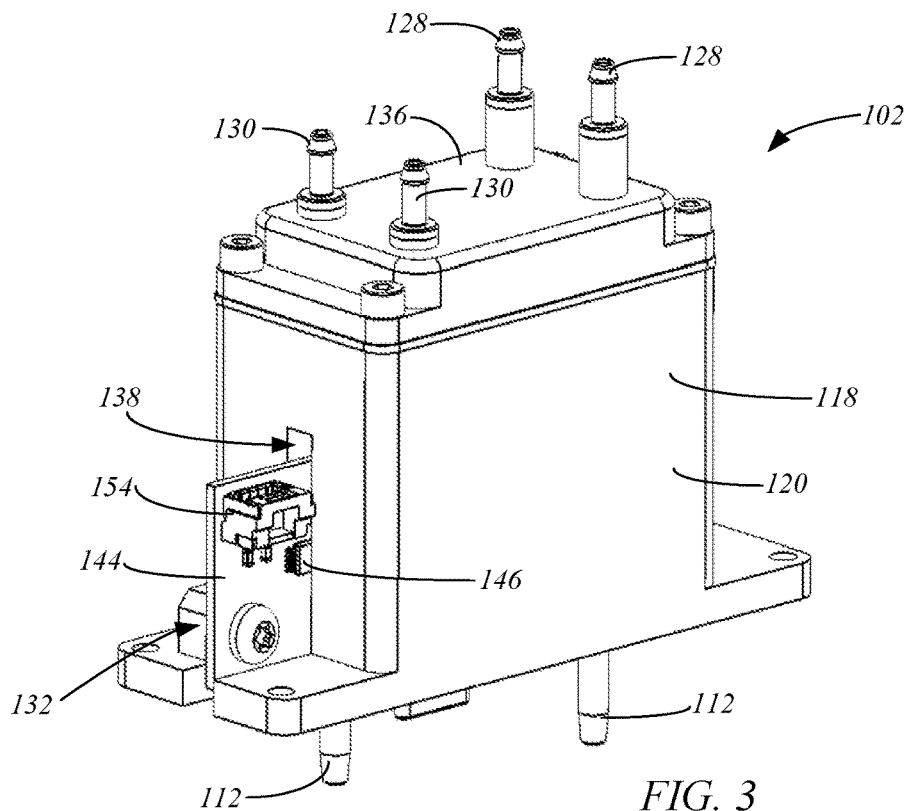
Figure 4:
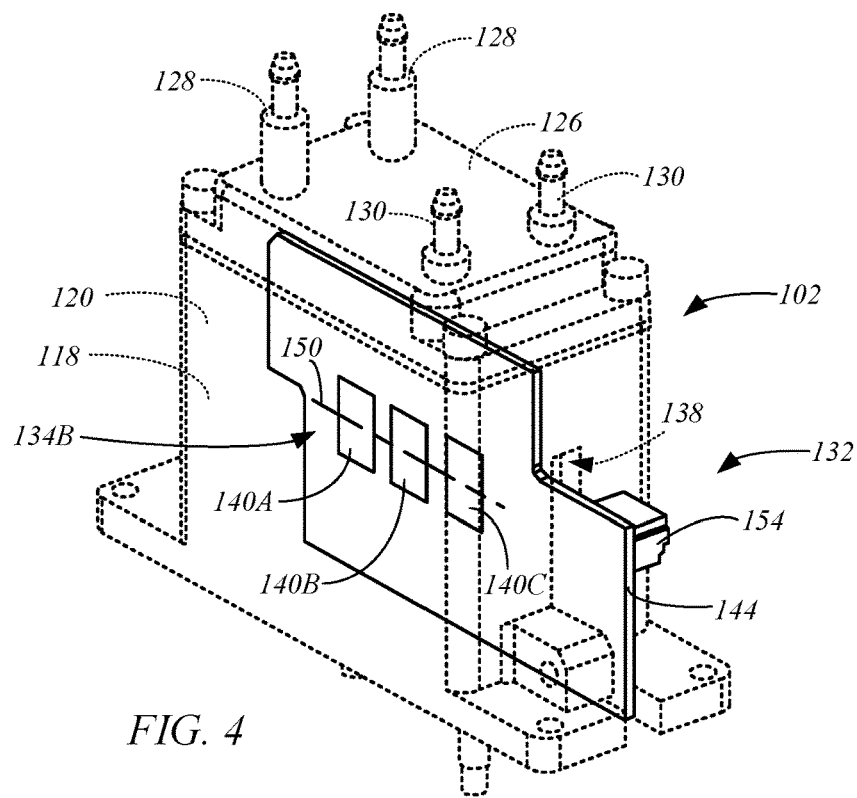
FIG. 4 is an isometric view of the ink supply of FIG. 2 having a transparent body.
Figure 5:
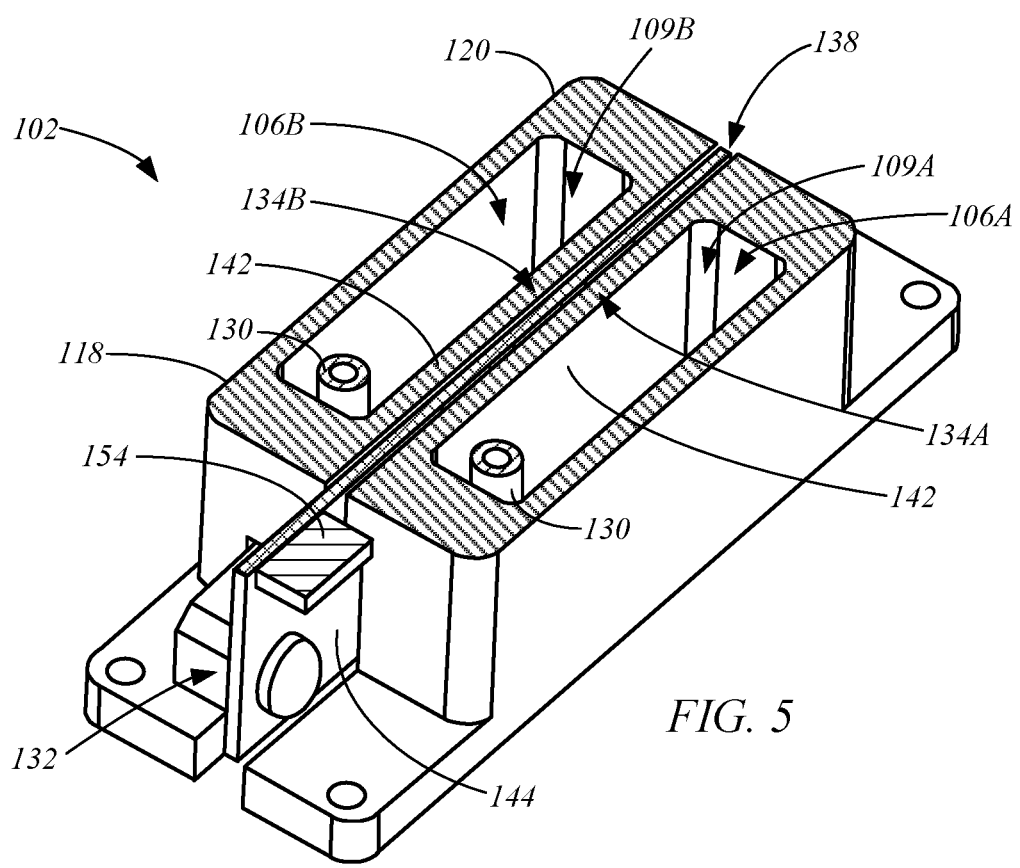
FIG. 5 is an isometric cross-sectional view of an exemplary ink supply taken generally along line 5-5 of FIG. 2, in accordance with embodiments of the present disclosure.

FIG. 1 is a simplified illustration of a print head 100 and an attached ink supply 102 in accordance with embodiments of the present disclosure. Exemplary embodiments of the ink supply 102 are also shown in FIGS. 2-5. FIGS. 2-4 are isometric views of an exemplary ink supply 102, and FIG. 5 is a cross-sectional view of the exemplary ink supply 102, in accordance with embodiments of the present disclosure.

The ink supply 102 includes one or more ink containers, generally referred to as 106. Each of the containers 106 is configured to contain a volume of ink, generally referred to as 108, within an interior chamber 109. For example, the exemplary ink supply 102 includes ink containers 106A and 106B, which are respectively configured to contain volumes of ink 108A and 108B within interior chambers 109A and 109B.

The ink 108 may be any ink that is suitable for use with a print head. In some embodiments, the ink 108 is a non-aqueous ink, an ultraviolet curable ink, or another suitable ink. In some embodiments, each of the containers 106 contains a different type (e.g., different color) of ink 108.

The print head 100 includes one or more nozzles 110, such as nozzles 110A and 110B. Each of the nozzles 110 operates to discharge the ink 108 received from the supply 102 in a conventional manner to print an image on a substrate. One exemplary print head 100 is the GH2220 inkjet print head produced by Ricoh.

In some embodiments, each of the containers 106 includes an output port 112 that is fluidically coupled to an input port 114 of one or more of the nozzles 110. Ink 108 discharged from one of the containers 106 travels through the output port 112 and is received by the input port 114 of the corresponding one or more nozzles 110. The ink 108 is fed through a channel 116 of the print head 100 to the corresponding one or more nozzles 110, which discharge the ink 108 in accordance with conventional ink jet printing techniques to form an image on a substrate.

In some embodiments, the ink containers 106 may be supported by, or formed integral with, a body 118, through which the output ports 112 extend. For example, the containers 106 may be cartridges that are configured to be attached to the body 118 for use, then removed from the body 118 to be refilled or disposed of. Alternatively, the containers 106 and the body 118 may form a header tank 120 (FIGS. 2-5) that may be positioned above the corresponding input port 114 of the print head 100, such as shown in FIG. 1.

In some embodiments, the ink supply 102 includes one or more bulk containers 122, each of which is configured to periodically replenish the ink 108 in the containers 106. For example, the supply 102 may include a bulk container 122A configured to supply ink 108A to the container 106A, and a bulk container 122B configured to supply ink 108B to the container 106B, as shown in FIG. 1. The ink 108 may be fed from the one or more bulk containers 122 using one or more pumps, such as pumps 124A and pump 124B, for example.

In some embodiments, the ink containers 106 of the ink supply 102 are integrally formed in the body 118. The body 118 may be a molded plastic body or other suitable structure. The containers 106 may be sealed by a cover 126, as shown in FIGS. 2-4. The cover 126 may seal top openings in the containers 106, such as a top opening 127 of the container 106B shown in phantom lines in FIG. 2.

An input port 128 through the cover 126 may be provided for each container 106, through which ink 108 may be supplied to the container 106, such as from a corresponding bulk supply 122. An air pressure port 130 may also be provided for each container 106 to control the pressure within each of the containers 106.

The ink supply 102 includes a level sensor 132 that is configured to detect the level of the ink 108 in each of the containers 106 along a vertical axis 133 (FIG. 1), which indicates the remaining volumes of the ink 108 within the containers 106. In some embodiments, the level sensor 132 includes capacitive level sensors, generally referred to as 134, that are each configured to measure or detect a level of the ink 108 in one of the interior containers 106 along the axis. For example, the level sensor 132 may include a capacitive sensor 134A that is configured to output a level signal 136A that is indicative of a level of the ink 108A within the container 106A, and the capacitive sensor 134B is configured to output a level signal 136B that is indicative of a level of the ink 108B within the container 106B, as indicated in FIG. 1.

Figure 6:
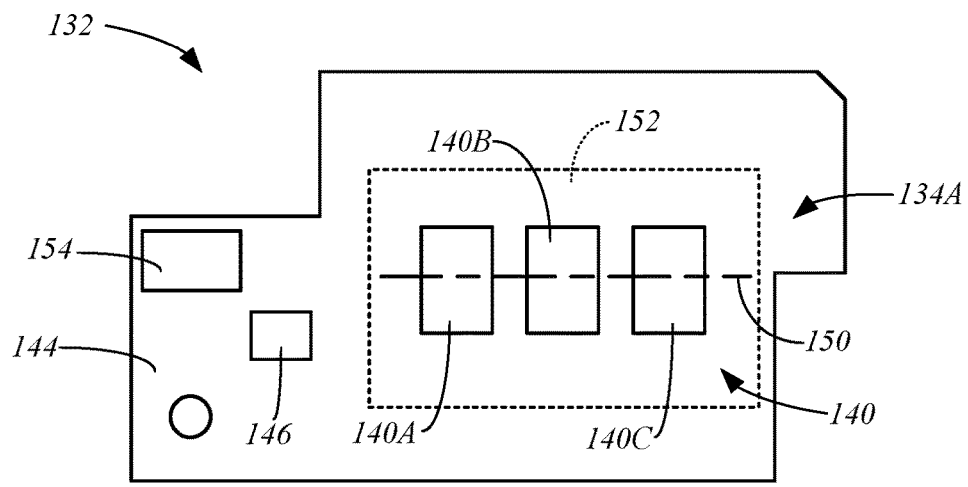
FIG. 6 is a simplified front view of an exemplary level sensor in accordance with embodiments of the present disclosure.
Figure 7:
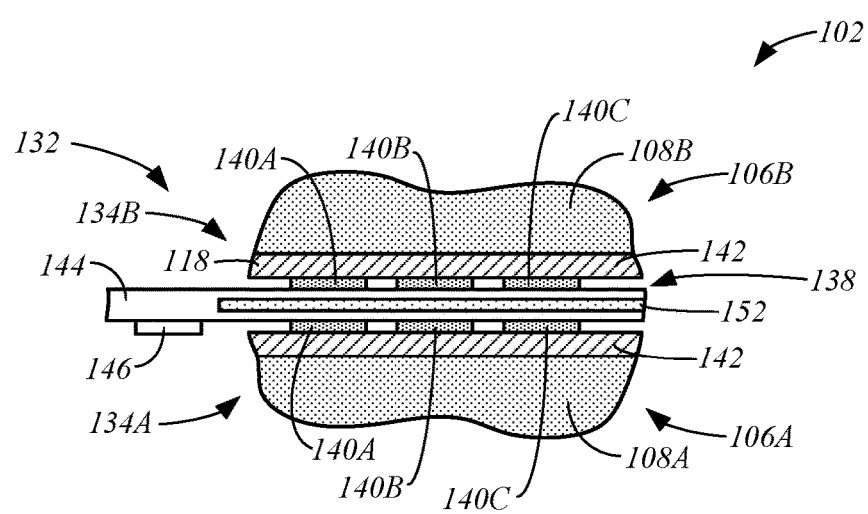
FIG. 7 is a top cross-sectional view of a portion of an exemplary ink supply in accordance with embodiments of the present disclosure.

FIG. 6 is a simplified front view of an exemplary level sensor 132 in accordance with embodiments of the present disclosure, and FIG. 7 is a top cross-sectional view of a portion of the ink supply 102 in accordance with embodiments of the present disclosure. In some embodiments, the exemplary level sensor 132 includes capacitive sensors 134A and 134B that are located on opposing sides of the level sensor 132, as shown in FIG. 7. The level sensor 132 may be received within a slot 138 of the body 118 between the ink containers 106A and 106B, as shown in FIGS. 1-5 and 7. This positions sensing elements 140 of the sensors 134A and 134B adjacent to the interior walls 142 of the ink containers 106A and 106B. Thus, the sensing elements 140 and other circuitry of the level sensor 132 are isolated from the ink 108 within the containers 106. In some embodiments, the level sensor 132 comprises a printed circuit board 144, to which capacitive sensing circuitry 146 and other components of the level sensor 132 are attached.

The ink 108 within each of the containers 106 acts as a dielectric that affects the capacitance between the sensing elements 140 of each sensor 134. As the level of ink 108 within a container 106 changes, so does the sensed capacitance between the sensing elements 140, particularly around a predetermined threshold level 148 (FIG. 1). This behavior may be used to detect a low level of ink 108 within a given container 106, such as when the level of ink 108 has a predetermined relationship to the threshold level 148. For example, the capacitance detected through the sensing elements 140 may indicate when the level of ink 108 in the corresponding container 106 has dropped below the threshold level 148.

In some embodiments, the sensing elements 140 comprise a plurality of electrodes, such as electrodes 140A-C. The electrodes 140A-C are separated from each other and extend along a horizontal axis 150, as shown in FIG. 6. The vertical position of the horizontal axis 130 relative to the corresponding ink container 106 generally determines the threshold level 148 (FIG. 1), at which the signal 136 from the sensor 134 will indicate a low ink level condition.

In some embodiments, the horizontal axis 150 sets a threshold level 148 that corresponds to approximately 25-50% of a full level or full capacity of the corresponding container 106. This configuration is generally suitable when the container 106 is in the form of the header tank 120. Here, the output signal 136 indicating that the ink 108 within a container 106 has reached this threshold level may trigger a pump, such as pump 124A or pump 124B, to begin filling the corresponding container 106 with ink 108 from a corresponding bulk supply, such as bulk supply 122A or 122B, for example.

In other embodiments, the threshold level 148 is set to a lower level, such as a level corresponding to approximately 5-15% of a full level or full capacity of the corresponding container 106. Such a setting for the threshold level 148 is generally suitable for ink supplies 102 having containers 106 in the form of cartridges that have a limited supply of ink 108. Here, the signal 136 may trigger a notification to a user that one or more of the containers 106 of the supply 102 may soon require refilling or replacement.

The capacitive sensors 134 may operate to provide the desired level detection in accordance with any suitable technique. In some embodiments, at least one of the sensing elements 140, such as central sensing element 140B of each capacitive sensor 134, is coupled to an excitation signal (e.g., voltage) supplied from the circuitry 146, for example. The other sensing elements, such as 140A and 140C, may be coupled to electrical ground. The capacitance between the sensing elements 140 can be detected by the circuitry 146 by measuring a current flowing to the sensing element 140B in response to the excitation voltage, in accordance with conventional techniques.

In some embodiments, the sensor 132 includes a shielding layer 152 that is positioned between the sensing elements 140 of the capacitive sensors 134A and 134B, and is formed of an electrically conductive material, such as copper. In some embodiments, the circuitry 126 supplies the shielding layer 152 with the same excitation voltage as that delivered to the sensing element 140B. As a result, no current flows between the sensing element 140B and the shielding layer 152 during a capacitive measurement by the corresponding sensor 134. Thus, the shielding layer 152 isolates the sensing elements 140 of the sensors 134A and 134B from each other.

This prevents capacitance changes in one of the sensors 134 from affecting the other sensor 134.

In some embodiments, the capacitive sensors 134A and 134B do not perform simultaneous capacitive measurements to detect the level of the ink 108 in the corresponding ink containers 106A and 106B. Rather, the excitation voltage may be delivered to the sensing element 140B of each sensor 134A and 134B at different times through, for example, a suitable multiplexor.

In some embodiments, the level sensor 132 includes input/output circuitry 154. The circuitry 154 may include electrical connectors for receiving electrical power for powering the circuitry 146, connections for communicating data between host electronics and the circuitry 146, and/or other circuit connections. In some embodiments, the output signals 136A and 136B from the capacitive sensors 134A and 134B are analog signals that may be converted to digital signals by the circuitry 146 of the sensor 132, or using circuitry that is external to the sensor 132.

Figure 8:
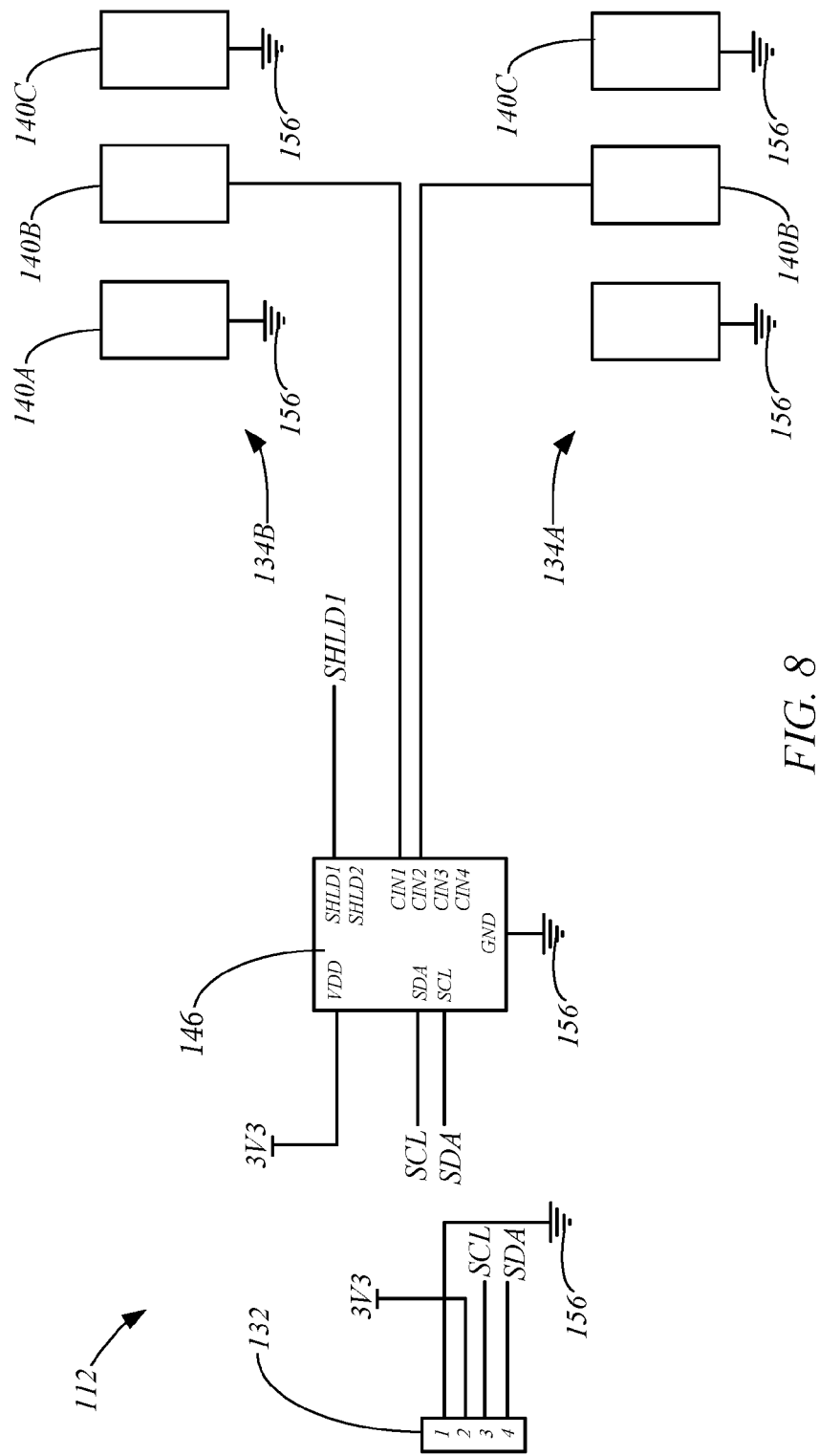
FIG. 8 is a circuit diagram of an exemplary level sensor in accordance with embodiments of the present disclosure.

In some embodiments, the circuitry 146 may be provided in an integrated circuit chip, which may be supported on the circuit board 144. One suitable integrated circuit chip that may be used for the circuitry 146 is the FDC1004 produced by Texas Instruments Incorporated. FIG. 8 is a circuit diagram of an exemplary level sensor 132 illustrating the use of this chip 146 to form the capacitive sensors 134A and 134B. In one exemplary arrangement, the sensing elements 140B are each coupled to the inputs (e.g., CN2 and CN3) that receive an excitation signal generated by the chip 146. The sensing elements 140A and 140C are each connected to electrical ground 156. The shielding layer 152 may be coupled to one of the shield pins (e.g., SHLD1) of the chip 146 that also receives the excitation signal. A serial interface clock (SCL) pin receives a master clock signal. Capacitance measurements are supplied at a serial interfaced bidirectional data (SDA) pin.

Embodiments of the ink supply 102 and print head 100 may be used as a print unit in a credential production device for producing credential products such as, for example, identification cards, driver's licenses, passports, and other documents, or other printing device. Such credentials are formed from credential or card substrates including paper substrates, plastic substrates, cards, and other materials. Such credentials generally include printed information, such as a photo, account numbers, identification numbers, and other personal information. Credentials can also include data that is encoded in a smartcard chip, a magnetic stripe, or a barcode, for example.

Figure 9A:
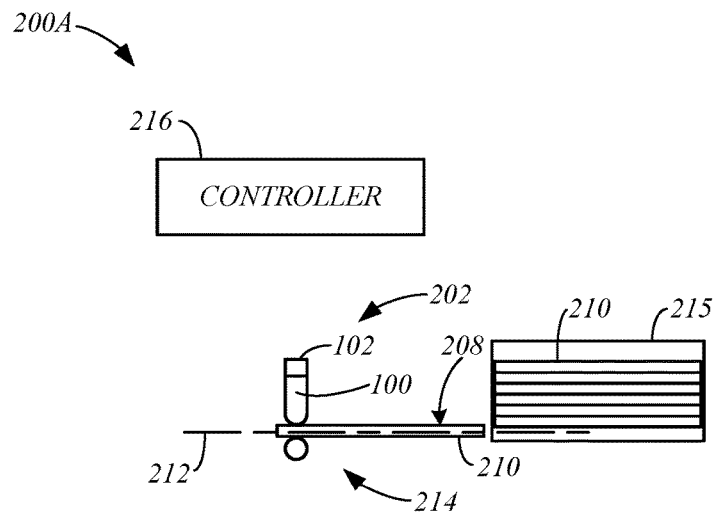
FIGS. 9A and 9B are simplified side views of exemplary credential production devices, with which embodiments of the ink supply may be used.
Figure 9B:
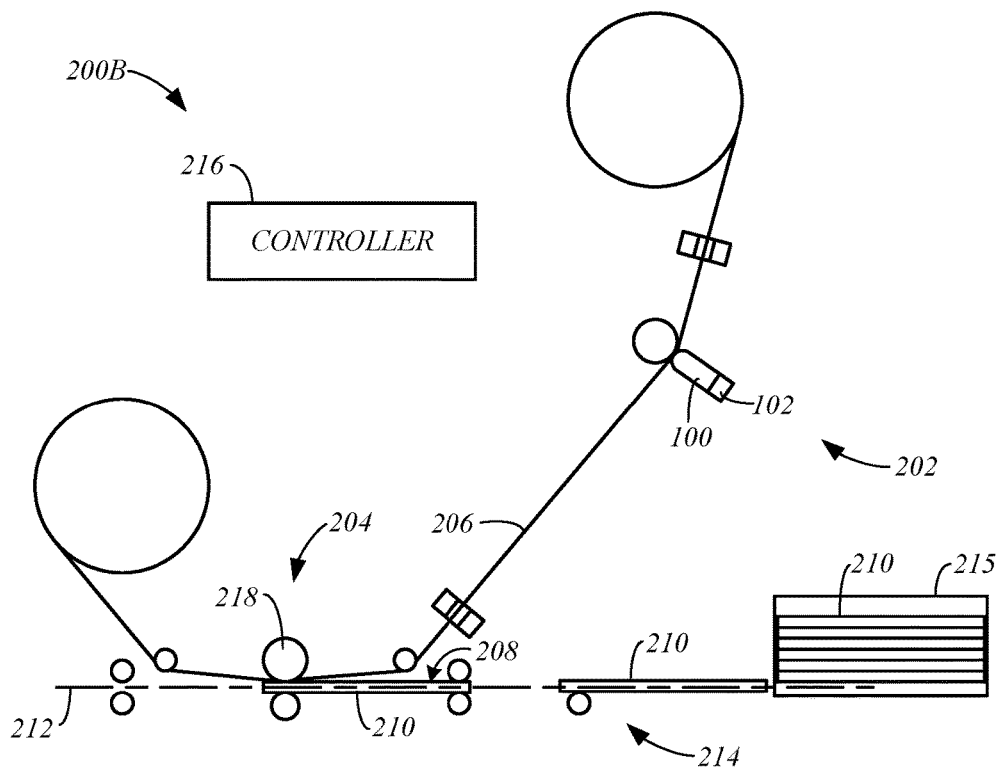

FIGS. 9A-B respectively are simplified side views of exemplary credential production devices 200A and 200B, in accordance with embodiments of the present disclosure. The device 200A is configured as a direct-to-substrate printer, in which a print unit 202 is configured to print an image directly to a surface 208 of a substrate 210 that is fed along a processing path 212. The print unit 202 can include the print head 100 and ink supply 102 formed in accordance with one or more embodiments described herein. The print head 100 is configured to print an image to the substrate 210 using ink received from the supply 102.

The device 200B is configured as a reverse-image printing device and includes the print unit 202, a transfer unit 204, and a transfer ribbon 206. The print unit 202 is configured to print an image to the transfer ribbon 206. The transfer unit 204 is configured to transfer the printed image from the transfer ribbon 206 to a surface 208 of a substrate 210 that is fed along a processing path 212 using a transport mechanism 214 from a supply 215 of the substrates 210.

In some embodiments, the transfer unit 204 includes a transfer device 218, such as a conventional heated transfer roller, or other suitable device that is configured to transfer imaged print sections of the transfer ribbon 206 to the surface 208 of the substrate 210 in accordance with conventional techniques. The transfer unit 204 may be configured to transfer a protective layer to the surface of the substrate 208, such as an overlaminate patch or film, in accordance with conventional techniques.

In some embodiments, the credential production devices 200A and 200B include a controller 216 representing one or more processors that are configured to execute program instructions stored in memory of the device, such as memory of the controller 216, or other location. The execution of the instructions by the controller 216 controls components of the corresponding credential production device 200A or 200B to perform functions and method steps described herein, such as a direct-to-substrate or reverse-image printing process, for example.

Additionally, the controller 216 may be configured to process the level signals 136 from the sensor 132 of the supply 102. The controller 216 may use the level signals 136 to control the delivery of ink 108 from the bulk containers 122 using the pumps 124. The controller 216 may also use the level signals 136 to provide notifications regarding the fill level of the containers 106, such as a notification that a level of ink 108 in one of the containers 106 is low or empty, for example.

Although the embodiments of the present disclosure have been described with reference to preferred embodiments, workers skilled in the art will recognize that changes may be made in form and detail without departing from the spirit and scope of the present disclosure.

What is claimed is:

1. A print head ink supply for use with a print head having one or more nozzles, the print head ink supply comprising:
   first and second containers each configured to contain a volume of ink within an interior chamber; and
   a level sensor comprising a circuit board positioned between a wall of the first container and a wall of the second container, the circuit board supporting a first capacitive sensor configured to output a first level signal indicative of a level of ink within the interior chamber of the first container and a second capacitive sensor configured to output a second level signal indicative of a level of ink within the interior chamber of the second container.

2. The print head ink supply according to claim 1, further comprising a body supporting the first and second containers.

3. The print head ink supply according to claim 2, wherein the body defines a slot between the first and second containers, and the level sensor is supported within the slot.

4. The print head ink supply according to claim 2, wherein the first and second capacitive sensors are supported on opposing sides of the circuit board.

5. The print head ink supply according to claim 4, wherein the first and second capacitive sensors each include a plurality of electrodes displaced from each other along an axis.

6. The print head ink supply according to claim 5, wherein the plurality of electrodes includes a pair of ground electrodes coupled to electrical ground, and an excitation electrode between the ground electrodes configured to receive an excitation signal.

7. The print head ink supply according to claim 4, wherein the first and second containers are integrally formed with the body.

8. The print head ink supply according to claim 7, wherein the first and second containers each have an open top, and the print head ink supply further comprises a cover attached to the body and covering the open tops of the first and second containers, wherein the cover includes an input port for each of the first and second containers.

9. The print head ink supply according to claim 4, further comprising an input port for each of the first and second containers.

10. The print head ink supply according to claim 9, further comprising first and second bulk containers and first and second pumps, wherein the first and second pumps are respectively configured to pump ink from the first and second bulk containers to the first and second containers through the input ports.

11. The print head ink supply according to claim 9, further comprising a pressure port for each of the first and second containers, each pressure port configured to control a pressure within the interior cavity of the corresponding first or second container.

12. A credential production device comprising:
a transport mechanism configured to feed individual substrates along a processing path;
a print head including a plurality of nozzles;
an ink supply configured to supply the plurality of nozzles with ink, the ink supply including:
first and second containers each configured to contain a volume of ink within an interior chamber; and
a level sensor comprising a circuit board positioned between a wall of the first container and a wall of the second container, the circuit board supporting a first capacitive sensor configured to output a first level signal indicative of a level of ink within the interior chamber of the first container and a second capacitive sensor configured to output a second level signal indicative of a level of ink within the interior chamber of the second container; and
a controller configured to perform a print operation using the transport mechanism and the print head and detect low level ink conditions within the first and second containers using the first and second level signals.

13. The device according to claim 12, wherein:
the ink supply includes a body supporting first and second containers and defining a slot between the first and second containers; and
the level sensor is supported by the body within the slot.

14. The device according to claim 13, wherein the first and second capacitive sensors are attached to opposing sides of the circuit board.

15. The device according to claim 14, wherein the first and second capacitive sensors each include a plurality of electrodes displaced from each other along an axis.

16. The device according to claim 15, wherein the plurality of electrodes includes a pair of ground electrodes coupled to electrical ground, and an excitation electrode between the ground electrodes configured to receive an excitation signal.

17. The device according to claim 13, wherein:
the first and second containers are integrally formed with the body;
the first and second containers each have an open top;
the ink supply comprises a cover attached to the body and covering the open tops of the first and second containers;
the cover includes an input port for each of the first and second containers;
the ink supply comprises first and second bulk containers and first and second pumps; and
the first and second pumps are respectively configured to pump ink from the first and second bulk containers to the first and second containers through the input ports of the cover.

18. The device according to claim 12, further comprising:
an input port for each of the first and second containers;
first and second bulk containers; and
first and second pumps;
wherein the first and second pumps are respectively configured to pump ink from the first and second bulk containers to the first and second containers through the input ports.

19. A print head ink supply comprising:
an ink container configured to contain a volume of ink within an interior chamber; and
a level sensor comprising a circuit board adjacent to a side wall of the ink container, the circuit board comprising:
a first plurality of sensing elements isolated from the ink within the container, the first plurality of sensing elements separated from one another along an axis, a first one of the first plurality of sensing elements configured to receive an excitation signal; and
a shielding layer comprised of electrically conductive material and configured to receive the excitation signal.

20. The print head ink supply according to claim 19, wherein the circuit board further comprises a second plurality of sensing elements located on an opposite side of the shielding layer from the first plurality of sensing elements.

* * * * *